(12) United States Patent
Frazier et al.

(10) Patent No.: US 7,587,889 B2
(45) Date of Patent: Sep. 15, 2009

(54) SYSTEM FOR DETERMINING NOX CONVERSION EFFICIENCY OF AN EXHAUST GAS AFTERTREATMENT COMPONENT

(75) Inventors: Timothy R. Frazier, Columbus, IN (US); Ken R. Federle, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 91 days.

(21) Appl. No.: 11/456,602

(22) Filed: Jul. 11, 2006

(65) Prior Publication Data
US 2008/0010974 A1    Jan. 17, 2008

(51) Int. Cl.
*F01N 3/00* (2006.01)

(52) U.S. Cl. .............................. 60/285; 60/277; 60/286; 60/295; 60/297; 60/301

(58) Field of Classification Search .................. 60/274, 60/276, 278, 280, 285, 295, 297, 301, 277, 60/286
See application file for complete search history.

(56) References Cited

U.S. PATENT DOCUMENTS

| | | | |
|---|---|---|---|
| 6,209,313 B1 * | 4/2001 | Wissler et al. | 60/274 |
| 6,318,075 B1 * | 11/2001 | Gunther et al. | 60/285 |
| 6,347,512 B1 * | 2/2002 | Kolmanovsky et al. | 60/274 |
| 6,422,003 B1 * | 7/2002 | Ament et al. | 60/278 |
| 6,499,291 B2 * | 12/2002 | Lang et al. | 60/277 |
| 6,829,530 B2 | 12/2004 | Mauro et al. | |
| 6,889,497 B2 * | 5/2005 | Schnaibel et al. | 60/285 |
| 6,981,368 B2 * | 1/2006 | van Nieuwstadt et al. | 60/277 |

* cited by examiner

*Primary Examiner*—Binh Q Tran
(74) *Attorney, Agent, or Firm*—J. Bruce Schelkopf; Barnes & Thornburg LLP

(57) ABSTRACT

A system for determining a NOx conversion efficiency of an exhaust gas aftertreatment component comprises means for determining an operating temperature of the exhaust gas aftertreatment component, and a control circuit. The control circuit includes a memory having instructions stored therein that are executable by the control circuit to determine a time duration that the operating temperature of the exhaust gas aftertreatment component is above a predefined temperature, and to determine the NOx conversion efficiency of the exhaust gas aftertreatment component as a function of the time duration.

7 Claims, 5 Drawing Sheets

SYSTEM FOR DETERMINING NOX CONVERSION EFFICIENCY OF AN EXHAUST GAS AFTERTREATMENT COMPONENT

FIELD OF THE INVENTION

The present invention relates generally to exhaust gas aftertreatment systems for internal combustion engines, and more specifically to systems and techniques for determining the NOx conversion efficiency of exhaust gas aftertreatment components.

BACKGROUND

Exhaust gas aftertreatment systems for reducing NOx emissions of internal combustion engines are known. With such systems, it is desirable to determine at any given time a NOx conversion efficiency of one or more NOx-reducing catalysts forming part of the exhaust gas aftertreatment system. It may be desirable, for example, to then control the NOx output of the engine as a function of the NOx conversion efficiency of the one or more NOx-reducing catalysts.

SUMMARY

The present invention may comprise one or more of the features recited in the attached claims, and/or one or more of the following features and combinations thereof. A system for determining a NOx conversion efficiency of an exhaust gas aftertreatment component coupled to an internal combustion engine may comprise means for determining an operating temperature of the exhaust gas aftertreatment component, and a control circuit. The control circuit may include a memory having instructions stored therein that are executable by the control circuit to determine a time duration that the operating temperature of the exhaust gas aftertreatment component is above a predefined temperature, and to determine the NOx conversion efficiency of the exhaust gas aftertreatment component as a function of the time duration.

The memory may include a model of the NOx conversion efficiency of the exhaust gas aftertreatment component as a function of the time duration. The control circuit may be operable to determine the NOx conversion efficiency of the exhaust gas aftertreatment component, as a function of the time duration, according to the model. The model may be stored in the memory as a table having a table axis defining discrete time duration values and being populated by corresponding discrete NOx conversion efficiency values.

Alternatively, the control circuit may be operable to determine an initial value of the NOx conversion efficiency of the exhaust gas aftertreatment component, as a function of the time duration, according to the model. The memory may further include a multiplier model producing a multiplier as a function of at least one operating parameter that is different from the operating temperature of the exhaust gas aftertreatment component. The instructions executable by the control circuit may include instructions to multiply the initial value of the NOx conversion efficiency by the multiplier to determine the NOx conversion efficiency of the exhaust gas aftertreatment component. The system may further comprise means for determining a pressure differential across the exhaust gas aftertreatment component. At least one operating parameter may include the pressure differential across the exhaust gas aftertreatment component. The multiplier model may be configured to determine a particulate loading value as a function of the pressure differential across the exhaust gas aftertreatment component, and to determine the multiplier as a function of the particulate loading value. The particulate loading value may correspond to a reduction in particulate filtering capability resulting from particulate loading of the exhaust gas aftertreatment component.

The memory may further include a number of multiplier models each producing a different multiplier as a function one or more operating parameters that are different from the operating temperature of the exhaust gas aftertreatment component. The instructions executable by the control circuit may include instruction to multiply the initial value of the NOx conversion efficiency by each of the different multipliers to determine the NOx conversion efficiency of the exhaust gas aftertreatment component.

The system may further comprise a fuel system coupled to the engine. The fuel system may be configured to be responsive to at least one fuel signal produced by the control circuit to supply fuel to the engine. The system may further comprise an air handling system coupled to the engine. The air handling system may be configured to be responsive to at least one air handling system control signal to control intake air supplied to the engine. The instructions may include instructions executable by the control circuit to control NOx produced by the engine by controlling either of the at least one fuel signal and the at least one air handling system control signal based on the NOx conversion efficiency. The instructions executable by the control circuit to control NOx produced by the engine may include instructions to determine a maximum NOx value corresponding to a maximum allowable NOx amount exiting the aftertreatment component, and to control the NOx produced by the engine, by controlling either of the at least one fuel signal and the at least one air handling system control signal based on the NOx conversion efficiency so that the amount of NOx exiting the aftertreatment component is maintained below the maximum NOx value.

The aftertreatment component may be a NOx adsorber. Alternatively, the aftertreatment component may be a selective catalytic reduction (SCR) catalyst wherein the SCR catalyst is configured to react with engine exhaust gas and a reagent solution to reduce NOx content of the engine exhaust gas.

A system for determining a NOx conversion efficiency of an exhaust gas aftertreatment component coupled to an internal combustion engine may comprise a first temperature sensor and a control circuit. The first temperature sensor may be configured to produce a first temperature signal relating to operation of the exhaust gas aftertreatment component. The control circuit may be configured to determine an accumulated time duration, as a function of the first temperature signal, that an operating temperature of the exhaust gas aftertreatment component is above a predefined temperature, and to determine the NOx conversion efficiency of the exhaust gas aftertreatment component as a function of the accumulated time duration.

The first temperature sensor may be positioned upstream of the exhaust gas aftertreatment component. In this case, the first temperature signal may correspond to a temperature of exhaust gas entering the exhaust gas aftertreatment component. The control circuit may be configured to determine the accumulated time duration as an amount of time that the first temperature signal is above the predefined temperature.

Alternatively, the first temperature sensor may be positioned downstream of the exhaust gas aftertreatment component. In this case, the first temperature signal may correspond to a temperature of exhaust gas exiting the exhaust gas aftertreatment component. The control circuit is configured to determine the accumulated time duration as an amount of time that the first temperature signal is above the predefined temperature.

Alternatively still, the first temperature sensor may be positioned in communication with an exhaust gas aftertreatment bed of the exhaust gas aftertreatment component. In the case, the first temperature signal may correspond to the operating temperature of the exhaust gas aftertreatment component. The control circuit may be configured to determine the accumulated time duration as an amount of time that the first temperature signal is above the predefined temperature.

Alternatively still, the system may further comprise a second temperature sensor positioned downstream of the exhaust gas aftertreatment component. The second temperature sensor may be configured to produce a second temperature signal corresponding to a temperature of exhaust gas exiting the exhaust gas aftertreatment component. In this case, the control circuit may be configured to determine the accumulated time duration further as a function of the second temperature signal. The control circuit may be configured to estimate the operating temperature of the exhaust gas aftertreatment component as a function of the first and second temperature signals.

A method of determining a NOx conversion efficiency of an exhaust gas aftertreatment component coupled to an internal combustion engine may comprise monitoring an operating temperature of the exhaust gas aftertreatment component, accumulating a time duration corresponding to an amount of time that the operating temperature of the exhaust gas aftertreatment component exceeds a predefined temperature, and determining the NOx conversion efficiency as a function of the time duration.

The method may further comprise determining at least one multiplier as a function of one or more operating parameters different than the operating temperature of the exhaust gas aftertreatment component. In this case, determining the NOx conversion efficiency may include determining an initial value of the NOx conversion efficiency as a function of the time duration, and determining the NOx conversion efficiency as a product of the initial value of the NOx conversion efficiency and the at least one multiplier.

The method may further comprise controlling NOx produced by the engine by controlling either of at least one fuel signal supplied to a fuel system of the engine and at least one air handling system control signal supplied to an air handling system of the engine, based on the NOx conversion efficiency.

The method may further comprise determining a maximum NOx value corresponding to a maximum allowable NOx amount exiting the aftertreatment component, and controlling NOx produced by the engine by controlling either of at least one fuel signal supplied to a fuel system of the engine and at least one air handling system control signal supplied to an air handling system of the engine, based on the NOx conversion efficiency so that the amount of NOx exiting the aftertreatment component is maintained below the maximum NOx value.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
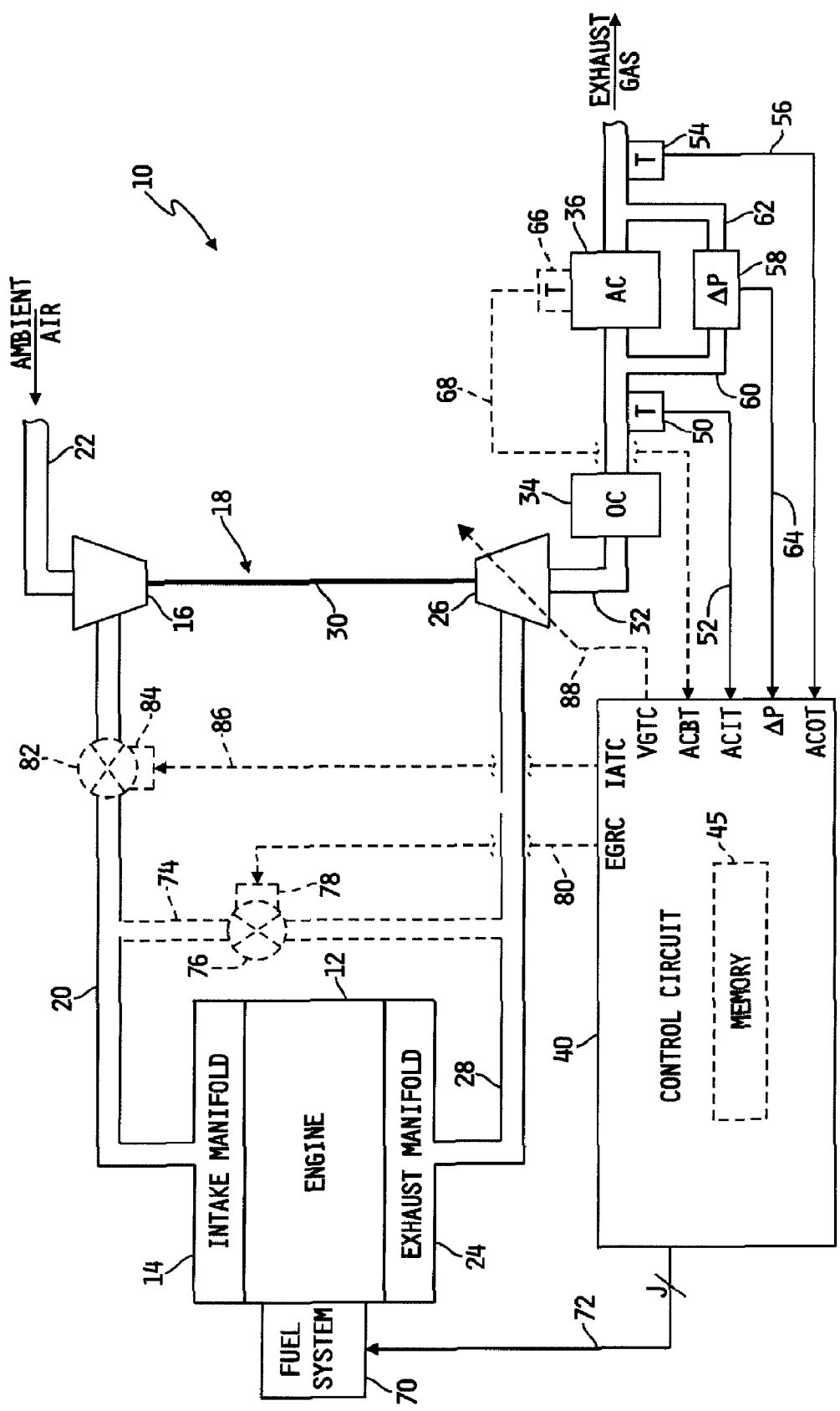
FIG. 1 is a diagrammatic illustration of a system for determining the NOx conversion efficiency of one exemplary exhaust gas aftertreatment component.

Referring now to FIG. 1, a diagram of one illustrative embodiment of a system 10 for determining NOx conversion efficiency of an exhaust gas aftertreatment component is shown. In the illustrated embodiment, the system 10 includes an internal combustion engine 12 having an intake manifold 14 fluidly coupled to a fresh air outlet of a compressor 16 of a turbocharger 18 via a conduit 20. A fresh air inlet of the compressor 16 is fluidly coupled to a fresh air intake conduit 22. An intake air cooler (not shown) may optionally be disposed in-line with the intake air conduit 20 to cool the fresh air supplied to the engine 12 by the compressor 16. An exhaust manifold 24 of the engine 12 is fluidly coupled to an exhaust gas inlet of a turbine 26 of the turbocharger 18 via an exhaust gas conduit 28. The turbine 26 is mechanically coupled via a rotatable drive shaft 30 to the compressor 16 in a conventional manner.

An exhaust gas outlet of the turbine 26 is fluidly coupled to an exhaust gas inlet of an oxidation catalyst (OC) 34 via an exhaust gas conduit 32. Alternatively or additionally, another oxidation catalyst, or so-called close-coupled catalyst (not shown), may be disposed in-line with the exhaust gas conduit 28 adjacent to the exhaust manifold 24. The oxidation catalyst 34 and/or close-coupled catalyst (not shown), in any case, includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such downstream exhaust gas aftertreatment component 36 is illustrated in FIG. 1, and is disposed in-line with the exhaust gas conduit 32 between the oxidation catalyst 34 and ambient. In the illustrated embodiment, the engine 12 is a conventional diesel engine, and the exhaust gas aftertreatment component (AC) 36 includes a conventional NOx adsorber. For purposes of this document, the exhaust aftertreatment component 36 may further include one or more additional exhaust gas aftertreatment component elements, and in any desired order relative to the direction of exhaust gas flow, although it will in all cases include at least a NOx adsorber. Examples of additional exhaust gas aftertreatment component elements include, but are not limited to, one or more particulate or soot filters or the like.

The system 10 further includes a conventional fuel system 70 that is responsive to a number, J, of fueling signals to supply fuel to the engine 12, where J may be any positive integer.

In one embodiment, the system 10 may further include an exhaust gas recirculation (EGR) conduit 74 fluidly coupled between the exhaust gas conduit 28 and the air intake conduit 20. In this embodiment, an EGR valve 76 may be disposed in-line with the EGR conduit 74, and may be controlled in a conventional manner to control the intake air supplied to the engine 12 by controlling the flow of exhaust gas from the exhaust gas conduit 28 to the intake manifold 14 of the engine 12. Optionally, an EGR cooler (not shown) may be disposed in-line with the EGR conduit 74, between the EGR valve 76 and the intake air conduit 20, to cool the exhaust gas flowing through the EGR conduit 74 prior to introducing the recirculated exhaust gas into the air intake conduit 20. The control concepts described herein are also applicable to non-EGR engines, and the EGR components 74 and 76 are accordingly shown in phantom in FIG. 1 to indicate that these components may or may not be included. Although the turbocharger 18 and its various components are not shown in phantom in FIG. 1, it will be understood that the control concepts described herein do not strictly require a turbocharger, and in some embodiments the turbocharger 18 may accordingly be omitted. In such cases, the air intake conduit 20 is fluidly coupled directly to the air intake conduit 22, and the exhaust gas conduit 28 is fluidly coupled directly to the exhaust gas conduit 32.

The system 10 may further include an intake air throttle or valve 82 disposed in-line with the intake air conduit 20 between the compressor 16 (in embodiments including a turbocharger 18) and the intake manifold 14. The intake air throttle or valve 82 may be controlled in a conventional manner to control the flow of intake air into the intake manifold 14 of the engine 12. The control concepts described herein are also applicable to engines that do not include an intake air throttle, and the intake air throttle or valve 82 is accordingly shown in phantom in FIG. 1 to indicate that this component may or may not be included.

The turbine 26 of the turbocharger 18, in embodiments including a turbocharger 18, may be a so-called variable geometry turbocharger (VGT). The VGT may be embodied in a conventional manner, indicated generally at 88, and may be controlled in a conventional manner to control the swallowing capacity and/or efficiency of the turbine 26 which, in turn, controls the flow of intake air supplied to the engine 12. Examples of such conventional VGT implementations include, but are not limited to, any one or combination of mechanisms that provide for controllable variability of the actual, physical volume of the turbine 26, a so-called wastegate valve or other air flow control mechanism that provides for controllable directing of at least some of the exhaust gas flow around the turbine 26, e.g., from the exhaust gas conduit 28 to the exhaust gas conduit 32, and/or an exhaust throttle or valve, typically disposed in-line with the exhaust gas conduit 28 or 32, that provides for control of the flow of exhaust gas through the turbine 26. The control concepts described herein are also applicable to engines that do not include one or more VGT mechanisms, and the general VGT mechanism 88 is accordingly shown in phantom in FIG. 1 to indicate that this component may or may not be included.

The system 10 further includes a control circuit 40 configured to control the overall operation of the engine 12, including the fuel system 70, as well as any associated air handling components, such as the EGR valve 74, intake air throttle 82 and/or one or more VGT mechanisms 88, if included within the system 10. In one embodiment, the control circuit 40 is a microprocessor-based control circuit typically referred to as an electronic or engine control module (ECM), or electronic or engine control unit (ECU). It will be understood, however, that the control circuit 40 may generally be or include one or more general purpose or application specific control circuits arranged and operable as will be described hereinafter. The control circuit 40 includes a conventional memory unit 45 for storing data and one or more software algorithms executable by the control circuit 40 to control the engine 12, including the fuel system 70, and any one or more air handling components illustrated and described herein.

The control circuit 40 includes a number of inputs receiving sensory information relating to operation of the engine 12, and operating signals and/or values relating to operation of the aftertreatment component 36. For example, the system 10 includes a temperature sensor 50 in fluid communication with the exhaust gas conduit 32 near the exhaust gas inlet of the aftertreatment component 36, and electrically connected to an aftertreatment component inlet temperature input, ACIT, of the control circuit 40 via a signal path 52. The temperature sensor 50 may be a conventional sensor, and is operable to produce a temperature signal on the signal path 52 that is indicative of the temperature of exhaust gas entering the exhaust gas inlet of the aftertreatment component 36.

The system 10 further includes another temperature sensor 54 in fluid communication with the exhaust gas conduit 32 near the exhaust gas outlet of the aftertreatment component 36, and electrically connected to an aftertreatment component outlet temperature input, ACOT, of the control circuit 40 via a signal path 56. The temperature sensor 54 may be a conventional sensor, and is operable to produce a temperature signal on the signal path 56 that is indicative of the temperature of exhaust gas exiting the exhaust gas outlet of the aftertreatment component 36.

The system 10 further includes a delta pressure ($\Delta$P) sensor 58 in fluid communication with a first conduit 60 that is fluidly coupled to the exhaust conduit 32 near the exhaust gas inlet of the aftertreatment component 36, and also in fluid communication with a second conduit 62 that is fluidly coupled to the exhaust conduit 32 near the exhaust gas outlet of the aftertreatment component 36. The $\Delta$P sensor 58 is electrically connected to an aftertreatment component delta pressure input, $\Delta$P, of the control circuit 40 via a signal path 64. The $\Delta$P sensor 58 may be a conventional sensor, and is operable to produce a pressure signal on the signal path 64 that is indicative of a pressure differential between the exhaust gas inlet and the exhaust gas outlet of the aftertreatment component 36.

Optionally, as shown in phantom in FIG. 1, the system 10 may further include a temperature sensor 66 in communication with the exhaust gas aftertreatment component 36, and electrically connected to an aftertreatment component bed temperature input, ACBT, of the control circuit 40 via a signal path 68. The temperature sensor 66 may be a conventional sensor, and is operable to produce a temperature signal on the signal path 68 that is indicative of the operating temperature of the active exhaust gas treatment area of the exhaust gas aftertreatment component 36, which may be referred to herein as the exhaust gas aftertreatment bed of the exhaust gas aftertreatment component 36. In this embodiment, for purposes of this disclosure, the temperature sensors 50 and 54 may be omitted.

The control circuit 40 further includes a number of outputs for providing control signals to one or more engine control and air handling mechanism actuators. For example, the system 10 further includes a conventional intake air throttle 82 disposed in-line with the intake air conduit 20. In embodiments that include the EGR components 74 and 76, the intake air throttle 82 is located upstream of the junction of the EGR conduit 74 and the intake air conduit 20. In embodiments that do not include the EGR components 74 and 76, the intake air throttle 82 may be located anywhere along the intake air conduit 20. In any case, the intake air throttle 82 includes an intake air throttle actuator 84 that is electrically connected to an intake air throttle command output, IATC, of the control circuit 40 via a signal path 86. The control circuit 40 is operable to control the actuator 84 in a conventional manner by providing appropriate control signals on the signal path 86 to actively control the flow of fresh air into the intake manifold 16.

The system 10 further includes a variable geometry turbocharger mechanism 88 configured to selectively control the swallowing capacity and/or efficiency of the turbine 26 and thereby control the flow rate of exhaust gas through the exhaust conduit 28 as well as the rotational speed of the turbine 26 and compressor 16. The variable geometry turbocharger mechanism 88 is electrically connected to a variable geometry turbocharger control output, VGTC, of the control circuit 40 via a signal path. The variable geometry turbocharger mechanism 88 may be or include a conventional variable geometry mechanism and actuator associated with the turbine 26 that is responsive to control signals provided by the control circuit 40 to correspondingly vary the swallowing capacity of the turbine 26. Alternatively or additionally, the variable geometry turbocharger mechanism 88 may be or include a conventional exhaust throttle that is responsive to control signals provided by the control circuit 40 to correspondingly control the efficiency of the turbine 26 by controlling the flow rate of exhaust gas through the exhaust gas conduits 28 and 32. It will be appreciated that the variable geometry turbocharger mechanism 88 may alternatively or additionally be or include other conventional mechanisms for controlling the swallowing capacity and/or efficiency of the turbine 26.

In embodiments of the system 10 that include the EGR components 74 and 76, the system 10 further includes an EGR valve actuator 78 that is electrically connected to an EGR valve command output, EGRC, of the control circuit 40 via a signal path 80. In this embodiment, the control circuit 40 is operable to control the actuator 78 in a conventional manner by providing appropriate control signals on the signal path 80 to actively control the flow of exhaust gas through the EGR conduit 74.

The system 10 further includes a conventional fuel system 70 that is electrically connected to a fuel signal output, FS, of the control circuit 40 via a number, J, of signal paths 72, where J may be any positive integer. The fuel system 70 is responsive to a number, J, of fueling signals provided on the J signal paths 72 to supply fuel to the engine 12.

Figure 2:
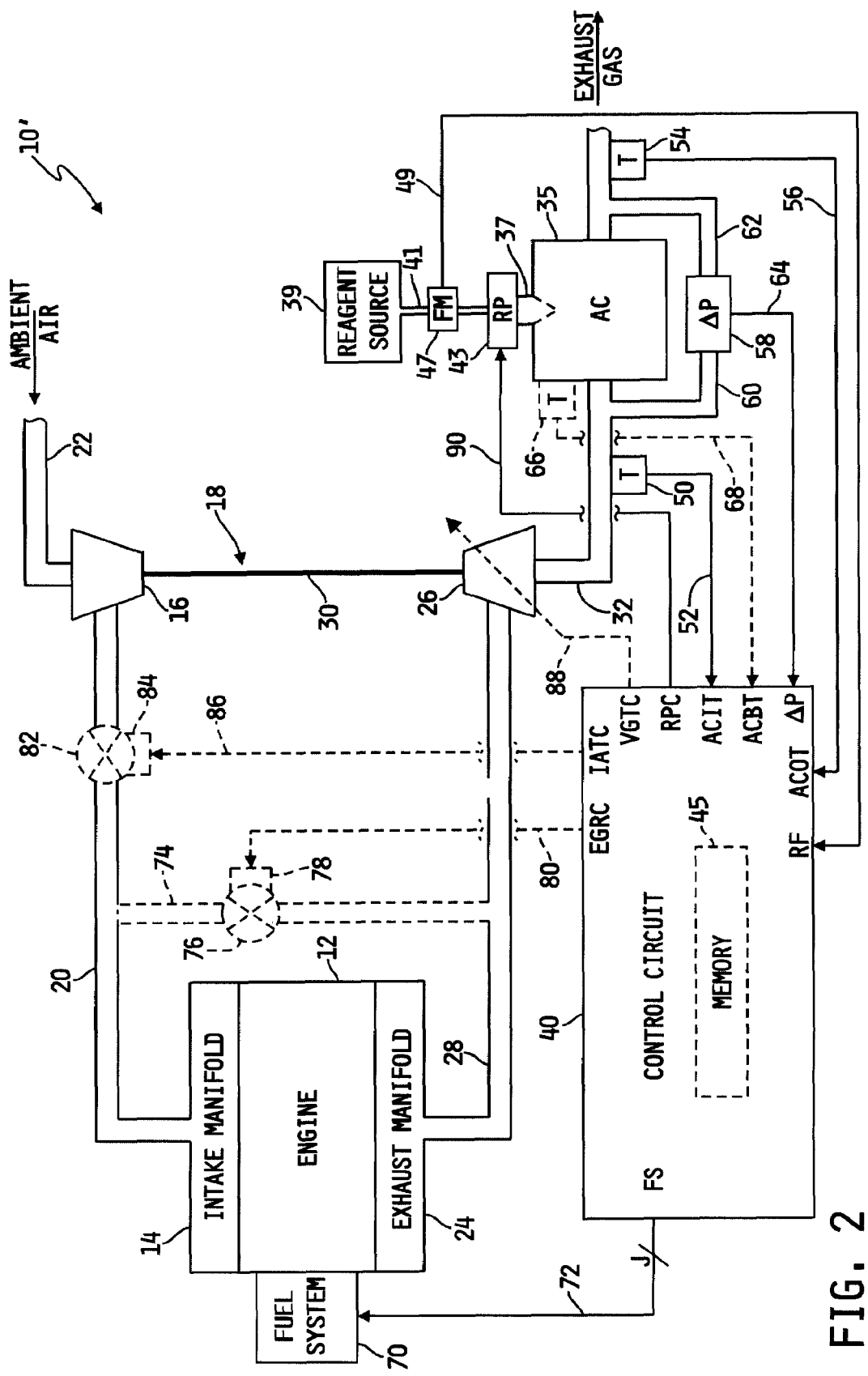
FIG. 2 is a diagrammatic illustration of a system for determining the NOx conversion efficiency of another exemplary exhaust gas aftertreatment component.

Referring now to FIG. 2, a diagram of another illustrative embodiment of a system 10' for determining NOx conversion efficiency of an exhaust gas aftertreatment component is shown. The embodiment illustrated in FIG. 2 is identical in many respects to the system 10 of FIG. 1, and like numbers are therefore used in FIG. 2 to identify like components. The system 10' differs from the system 10 primarily in the type of exhaust gas aftertreatment component that is implemented. In this embodiment, an exhaust gas aftertreatment component 35 is disposed in-line with the exhaust gas conduit 32 between the exhaust gas outlet of the turbine 26 and ambient. An oxidation catalyst is not shown in FIG. 2, although it will be understood that an oxidation catalyst of the type illustrated and described herein may be interposed between the exhaust gas outlet of the turbine 26 and the exhaust gas aftertreatment component 35. In any case, the engine 12 is, in the illustrated embodiment, a conventional diesel engine, and the exhaust gas aftertreatment component (AC) 35 includes a conventional selective catalytic reduction (SCR) catalyst configured to reduce the NOx content of the exhaust gas in a known manner. For purposes of this document, the exhaust aftertreatment component 35 may further include one or more additional exhaust gas aftertreatment component elements, and in any desired order relative to the direction of exhaust gas flow, although it will in all cases include at least an SCR catalyst. Examples of additional exhaust gas aftertreatment component elements include, but are not limited to, one or more particulate or soot filters or the like.

The system 10' further includes a conventional reagent source 39 configured to hold a conventional aqueous reagent solution; e.g., aqueous urea solution or the like. The reagent source 39 defines a reagent solution outlet fluidly coupled to one end of a reagent solution outlet conduit 41 having an opposite end fluidly coupled to an inlet of a conventional reagent solution pump 43. The reagent solution pump 43 may be a conventional pneumatic pump fluidly coupled to a conventional air compressor (not shown) driven by the engine 12, although it will be understood that the reagent solution pump 43 may alternatively be or include other conventional liquid supply pumps. In any case, a liquid outlet of the reagent solution pump 43 is fluidly coupled to an inlet of a reagent solution injector or spray nozzle 37 having an opposite solution dispensing end fluidly coupled to the emissions catalyst 35. The reagent solution pump 43 may be controlled in a known manner to selectively spray or otherwise dispense via the injector or spray nozzle 37 the reagent solution from the reagent source 39 into the exhaust gas stream flowing through the emission catalyst 35. In one embodiment, the reagent solution is sprayed directly into the SCR catalyst contained within the exhaust gas aftertreatment component 35 such that the reagent solution mixes with the exhaust gas flowing through the SCR catalyst, or alternatively into the exhaust gas aftertreatment component 35 just upstream of the SCR catalyst contained therein so that a combination of the exhaust gas exiting the exhaust conduit 32 and the reagent solution dispensed by the reagent pump 43 enters the SCR catalyst. In an alternative embodiment, the spray nozzle may be located sufficiently upstream of the SCR catalyst, e.g., in fluid communication with either the exhaust conduit 32 or the exhaust gas aftertreatment component 35 upstream of the SCR catalyst contained therein, so that the reagent solution that is dispensed by the spray nozzle 37 evaporates and coverts to ammonia before entering the SCR catalyst. In any case, the SCR catalyst is operable, as is known in the art, to react with the combination in a manner that reduces the level or amount of NOx in the exhaust gas entering the SCR catalyst to maintain the NOx level or amount in the exhaust gas exiting the SCR catalyst at or below a target NOx level or amount.

In the embodiment illustrated in FIG. 2, the control circuit 40 includes a number of inputs and outputs in addition to those illustrated and described hereinabove with respect to FIG. 1. Such additional inputs and outputs are provided for the purpose of controlling operation of the reagent source 39 and the reagent pump 43, although it will be understood that the control circuit 40 may further include additional inputs and outputs that are not illustrated in FIG. 2. For example, the system 10' further includes a flow meter or sensor 47 that is disposed in-line, or in fluid communication with, the reagent solution outlet conduit 41 extending from the reagent source 39, and that is electrically connected to a reagent flow rate, RF, input of the control circuit 40 via a signal path 49. The flow meter or sensor 47 may be of known construction, and is operable to produce a flow rate signal on the signal path 49 that is indicative of the flow rate of reagent solution from the reagent source 39 into the exhaust gas aftertreatment component 35.

The control circuit 40 further includes a reagent pump control output, RPC that is electrically connected to a control input of the reagent pump 43 via a signal path 90. The control circuit 40 is operable, in this embodiment, to control the operation of the reagent pump 43 in a known manner via the reagent pump control signal on signal path 90. The reagent pump 43 is, in turn, responsive to the reagent pump control signals to selectively dispense reagent solution from the reagent source 39 into the exhaust gas aftertreatment component 25 via the solution injector or spray nozzle 37.

It will be understood that while the systems 10 and 10' of FIGS. 1 and 2 respectively have been illustrated and described as having a single control circuit 40 that is configured to control the overall operation of the engine 12, including the fuel system 70, as well as any associated air handling components, alternative embodiments are contemplated having more than one such control circuit. As one example, an alternate embodiment of the system 10' of FIG. 2 is contemplated wherein one control circuit is configured to manage and control the overall operation of the engine 12, including the fuel system 70, and a separate aftertreatment control circuit may be provided to control and manage the overall operation of the exhaust gas aftertreatment system including, for example, the reagent pump 43 and reagent source 39. In such an embodiment, the control circuit 40 and the aftertreatment control circuit may be linked in a known manner for data communications between them in accordance with a conventional or proprietary communications protocol so that information available to the engine control circuit 40 can be shared with the aftertreatment control circuit and vice versa.

Figure 3:
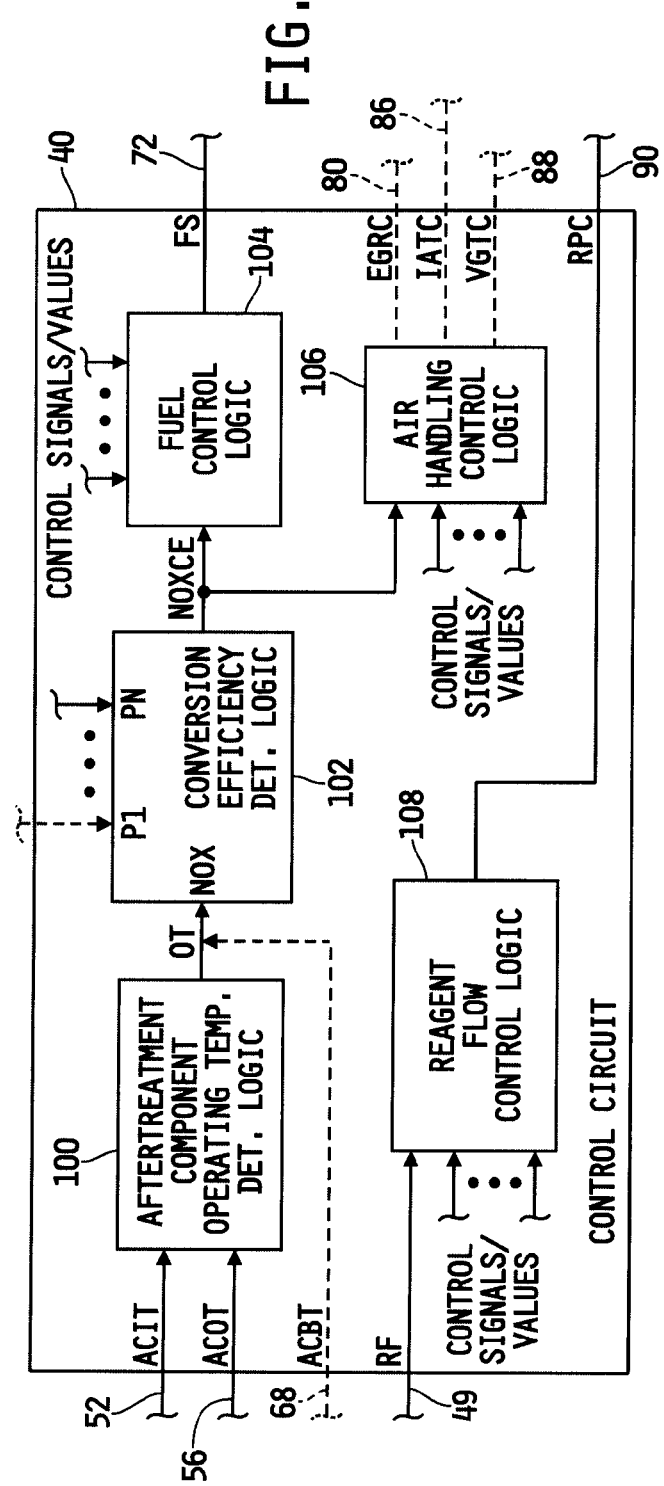
FIG. 3 is a block diagram of one illustrative embodiment of some of the software modules of the control circuit of either of FIGS. 1 and 2.

As described hereinabove, the control circuit 40 in the systems 10 and 10' illustrated in FIGS. 1 and 2 respectively includes, or is coupled to, a memory unit 45 that is configured to store data and other information therein. For example, the memory unit 45 is configured to store therein instructions in the form of one or more software algorithms executable by the control circuit 40 to control various operations of the engine 12 and associated air handling components. As one illustrative example, FIG. 3 illustrates a number of control structures defined by one or more such software algorithms. One such control structure is an aftertreatment component operating temperature determination logic block 100, receiving as inputs the aftertreatment component inlet temperature signal, ACIT, on signal path 52 and the aftertreatment component outlet temperature signal, ACOT, on signal path 56. The aftertreatment component operating temperature determination logic block 100 is configured generally to determine an exhaust gas aftertreatment component operating temperature, OT, as a function of ACIT and ACOT. In embodiments including the temperature sensor 66, the exhaust gas aftertreatment component operating temperature, OT, may be determined directly from the temperature signal produced by the temperature sensor 66d on signal path 68. In another alternative embodiment, although not specifically illustrated in FIG. 3, the exhaust gas aftertreatment component operating temperature, OT, may be determined directly from the temperature signal produced by either of the exhaust gas aftertreatment component inlet temperature sensor 50 or the exhaust gas aftertreatment component outlet temperature sensor 54. In any such alternate embodiments, the aftertreatment component operating temperature determination logic block 100 may be omitted.

The control circuit 40 further includes a NOx conversion efficiency determination logic block 102. In one embodiment, the NOx conversion efficiency determination logic block 102 has a single input receiving the exhaust gas aftertreatment component operating temperature, OT, from either the logic block 100 or directly from any of the temperature sensors 50, 54 or 60 as just described. In this embodiment, the NOx conversion efficiency determination logic block 102 is configured to determine a NOx conversion efficiency value, NOXCE, as a function of OT. In an alternative embodiment, as shown in phantom in FIG. 3, the NOx conversion efficiency determination logic block 102 may further receive as inputs one or more parameter values, P1-PN, where N may be any positive integer. The one or more parameter values, P1-PN, may be generated externally to the control circuit 40 and/or generated internally by the control circuit 40. Some examples of the one or more parameter values, P1-PN, will be provided hereinafter. In any case, in embodiments wherein one or more parameter values, P1-PN, are provided as inputs to the NOx conversion efficiency determination logic block 102, the NOx conversion efficiency determination logic block 102 is configured to determine the NOx conversion efficiency value, NOXCE, as a function of OT and the one or more parameter values, P1-PN.

The control circuit 40 further includes a fuel control logic block 104. The fuel control logic block 104 is generally responsive to a number of engine operating conditions, such as engine speed, ES, and a number of other control signals and/or values, to determine one or more appropriate fuel signals, FS, in a conventional manner. In the illustrated embodiment, the fuel control logic block 104 is additionally configured to modify the one or more fuel signals, FS, as a function of the NOx conversion efficiency value, NOXCE.

The control circuit 40 further includes an air handling control logic block 106. The air handling control logic block 104 is generally responsive to a number of engine operating conditions and other control signals and/or values, to determine one or more appropriate air handling system control signals of the type described hereinabove, e.g., EGRC, IATC and/or VGTC, in a conventional manner. In the illustrated embodiment, the air handling control logic block 106 is additionally configured to modify the one or more of the air handling system control signals, e.g., EGRC, IATC and/or VGTC, as a function of the NOx conversion efficiency value, NOXCE.

In embodiments of the control circuit 40 that are configured to control systems having a reagent source and associated reagent pump, such as the system 10' illustrated in FIG. 2, the control circuit 40 accordingly includes a reagent flow control logic block 108. The reagent flow control logic block 108 is responsive the reagent flow signal, RF, on signal path 49, as well a number of other control signals and/or values, to determine the reagent pump control signal, RPC, in a conventional manner. It will be understood that in embodiments of the control circuit 40 that are configured to control systems that do not have a reagent source and associated reagent pump, the reagent flow control logic block 108 may be omitted.

Figure 4:
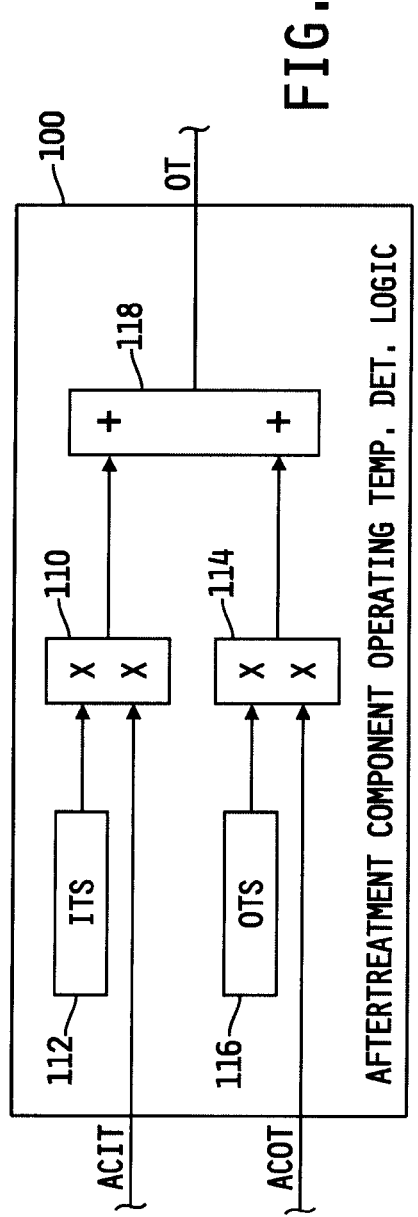
FIG. 4 is a block diagram of one illustrative embodiment of the aftertreatment component operating temperature determination logic block of FIG. 3.

Referring now to FIG. 4, a block diagram of one illustrative embodiment of the aftertreatment component operating temperature determination logic block 100 of FIG. 3 is shown. In the illustrated embodiment, the aftertreatment component operating temperature determination logic block 100 includes an aftertreatment component inlet temperature scale value, ITS, that is stored in a memory block 112 and is provided to a first input of a multiplication block 110 having a second input receiving the aftertreatment component inlet temperature signal, ACIT, produced by the temperature sensor 50. Likewise, an aftertreatment component outlet temperature scale value, OTS, is stored in a memory block 116, and is provided to one input of another multiplication block 114 having a second input receiving the aftertreatment component outlet temperature signal, ACOT, produced by the temperature sensor 54. The outputs of the multiplication blocks 110 and 114 are both provided to a summation block 118 producing as its output the exhaust gas aftertreatment component operating temperature value, OT, according to the equation OT=(CIT*CITS)+(COT*COTS). In the illustrated embodiment, the operating temperature value, OT, produced by the block 100 represents an estimated value of the aftertreatment component bed temperature. Those skilled in the art will recognize other algorithms, equations, functions or the like, that may be used to estimate an operating temperature of the exhaust gas aftertreatment component 35 or 36 that may or may not correspond to an aftertreatment component bed temperature, and any such other algorithms, equations, functions or the like are contemplated by this disclosure.

Figure 5:
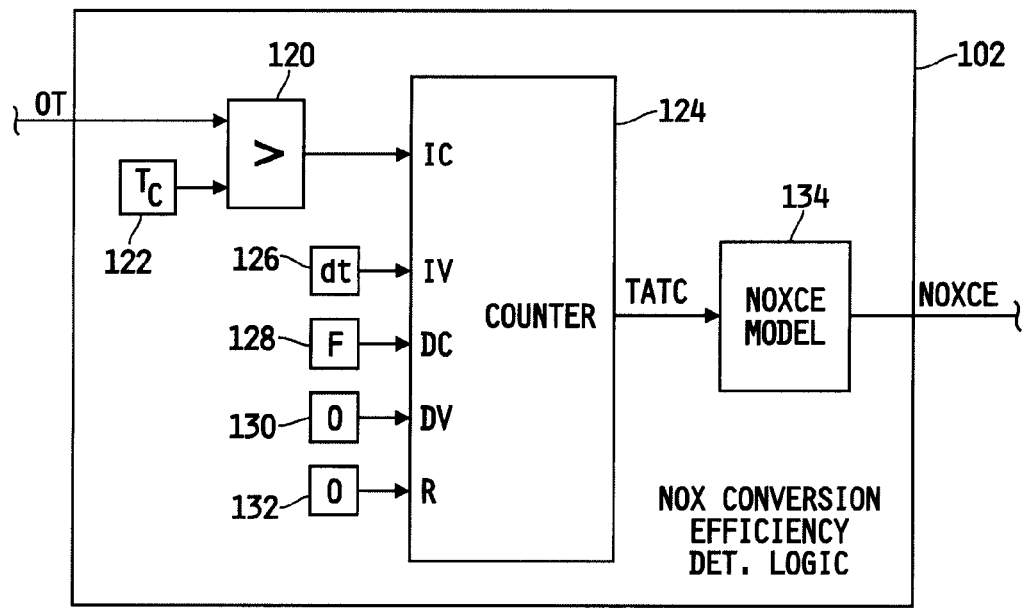
FIG. 5 is a block diagram of one illustrative embodiment of the NOx conversion efficiency determination logic block of FIG. 3.

Referring now to FIG. 5, a block diagram of one illustrative embodiment of the NOx Conversion Efficiency Determination Logic block 102 of FIG. 3 is shown. In the illustrated embodiment, the NOx Conversion Efficiency Determination Logic block 102 includes a "greater than" arithmetic block 120 having a first input that receives the operating temperature value, OT, and a second input that receives a predefined critical temperature value, Tc, that is stored in a memory location 122. In the embodiment illustrated in FIG. 5, the critical temperature value, Tc, is a constant temperature value, although the present disclosure contemplates that Tc may alternatively be a dynamic temperature value. In any case, the output of the arithmetic block 120 is configured to produce a "true" or logic "1" value when the operating temperature value, OT, is greater than the critical temperature, Tc, and to otherwise produce a "false" or logic "0" value. The output of the arithmetic block 120 is provided to an increment condition, IC, input of a counter block 246. An increment value, IV, input of the counter block 124 receives an increment value; e.g., dt, stored in a memory block 126. In the illustrated embodiment, the value "dt" corresponds to a unit of real time, so that the counter block 124 counts in increments of real time, although it will be understood that the increment value provided to the increment value, IV, of the counter block 124 may alternatively be another constant value or a dynamic value. In any case, a decrement condition input, DC, receives a false value, F, stored in a memory block 128, and a decrement value input, DV, of the counter block 124 receives a constant value; e.g., 0, stored in a memory block 130. A reset input, R, of the counter block 124 receives a non-resetting value, e.g., "0", stored in a memory block 132. In the illustrated embodiment, it is intended that the counter block 124 will therefore continually increment whenever the operating temperature, OT, of the exhaust gas aftertreatment component 35, 36 is greater than the critical temperature value, Tc. While not specifically shown in the drawings, it is further intended that the value of the memory block 132 may be overridden by a conventional calibration tool to reset the counter 124 under certain conditions, e.g., if all or some of the exhaust gas aftertreatment component 35, 36 is replaced. In any case, the count value of the counter block 124, TATC, corresponds to a duration of time that the operating temperature of the exhaust gas aftertreatment component 35, 36 is above the critical temperature value, Tc. An output of the counter block 124 is provided to an input of a NOx conversion efficiency model block 134, the output of which is the NOx conversion efficiency value, NOXCE.

The NOXCE model block 134 contains a model that continually determines the NOx conversion efficiency value, NOXCE, which corresponds to a NOx reduction capability of the exhaust gas aftertreatment component 35, 36, as a function of an accumulated duration of time that the operating temperature of the exhaust gas aftertreatment component 35, 36 exceeds the critical temperature value, Tc. Generally, Tc will be chosen to correspond to a temperature above which the exhaust gas aftertreatment component will experience decay or degradation. The NOXCE model may be stored in the memory block 134 in any of a variety of conventional forms. Examples of the form of the NOXCE model stored in the memory block 134 include, but are not limited to, one or more look-up tables having a table axis defining discrete time duration values, e.g., values of time above Tc and being populated with discrete NOx conversion efficiency values, one or more equations configured to compute or estimate NOx conversion efficiency as a function of the time above Tc, one or more plots or graphs relating time above Tc to NOx conversion efficiency values, one or more plots or graphs from which conventional pattern recognition techniques may be used to determine NOx conversion efficiency values from the time above Tc information, and the like. In any case, the NOXCE model will typically be configured to account for degradation or decay in NOx conversion capability of the exhaust gas aftertreatment component 35, 36 as compared with a new, clean (i.e., non-poisoned) exhaust gas aftertreatment component 35, 36. An example of one such NOXCE model, which should not be considered to be limiting in any way, may be formed by integrating the time above Tc information and then correlating this information to empirical exhaust gas aftertreatment component performance data. Those skilled in the art will recognize other techniques for forming such a NOXCE model, and any such other techniques are contemplated by this disclosure. In any case, the NOXCE model blocks 134 may be configured to compute NOXCE as a continual or periodic function of TATC.

Figure 6:
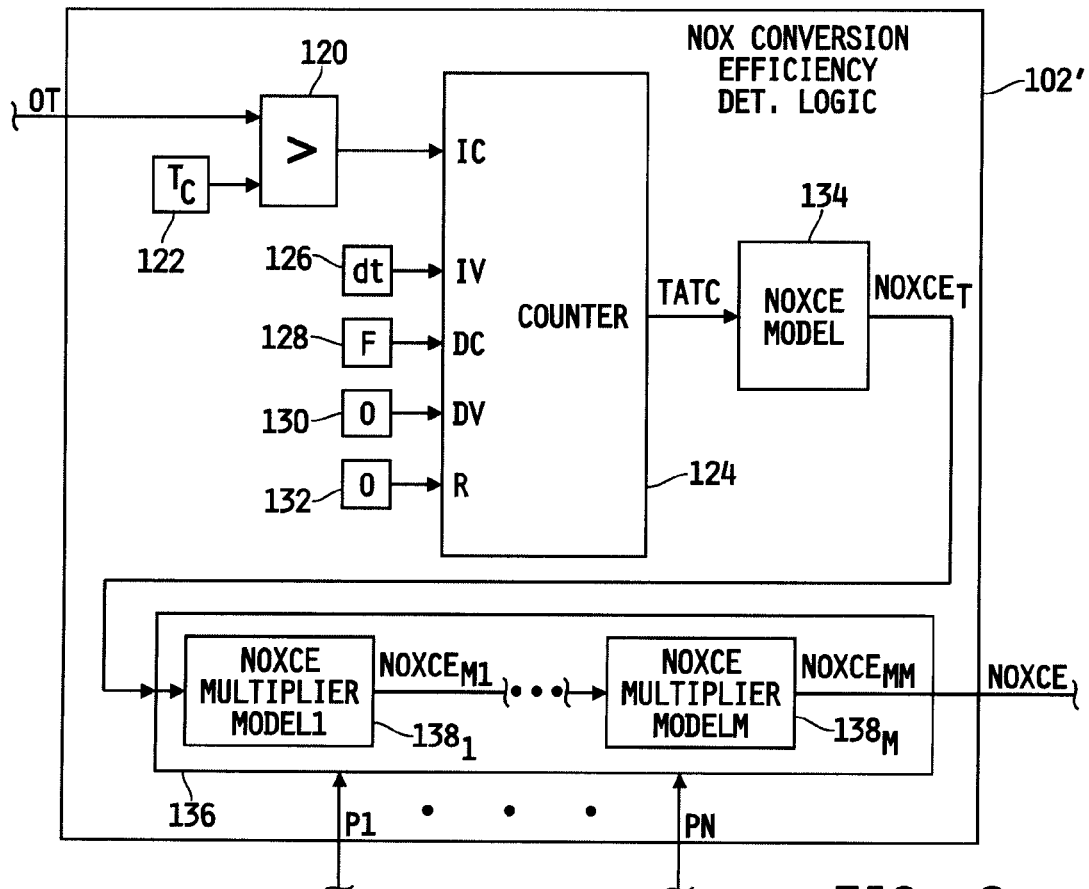
FIG. 6 is a block diagram of another illustrative embodiment of the NOx conversion efficiency determination logic block of FIG. 3.

Referring now to FIG. 6, a block diagram of another illustrative embodiment 102' of the NOx Conversion Efficiency Determination Logic block 102 of FIG. 3 is shown. The logic block 102' is identical in many respects to the logic block 102 of FIG. 5, and like numbers are therefore used to identify like components. The logic block 102' differs from the logic block 102 in that a multiplier model block 136 is positioned between the outlet of the NOXCE model block 134 and the NOx conversion efficiency output, NOXCE, of the logic block 102'. The multiplier model block 136 may include a number, M, of NOXCE multiplier model models $138_1$-$138_N$, where M may be any positive integer. In this embodiment, the operating temperature-based NOx conversion efficiency value, $NOXCE_T$, produced by the NOXCE model block 134 is an initial NOx conversion efficiency value gets multiplied by multiplier values associated with the number of NOx conversion efficiency multiplier model blocks $138_1$-$138_M$. The NOx conversion efficiency multiplier output values, $NOXCE_{M1}$-$NOXCE_{MM}$, associated with the number of NOXCE multiplier model blocks $138_1$-$138_M$ represent the initial NOx conversion efficiency value, $NOXCE_T$, multiplied the current and all previous multiplier values. Thus, if each of the number of NOXCE multiplier model blocks $138_1$-$138_M$ produces a corresponding multiplier value, $M_1$-$M_M$, the output of the first NOXCE multiplier model block $138_1$, if included in the model block 136, is $NOXCE_{M1}=NOXCE_T*M_1$, the output of the second NOXCE multiplier model block $138_2$, if the NOXCE multiplier model blocks $138_1$ and $138_2$ are both included in the model block 136, is $NOXCE_{M2}=NOXCE_T*M_1*M_2$, etc. If all "M"

NOXCE multiplier model blocks $138_1$-$138_M$ are included, the NOx conversion efficiency value produced by the NOx Conversion Efficiency Determination Logic block 102' is NOXCE=$NOXCE_T$*$M_1$*$M_2$* ... *$M_M$. The number of NOXCE multiplier model blocks $138_1$-$138_M$ may be configured to compute the multiplier values, $M_1$-$M_M$, continually or at some predefined rate.

Each of the number of NOXCE multiplier model blocks $138_1$-$138_M$ may receive as inputs any one or more of the number of parameter values, P1-PN, where any one or more of the P1-PN values may be generated externally to the control circuit 40 or internally to the control circuit 40 as described hereinabove. Generally, though, each of the number of parameter values P1-PN is different from the operating temperature, OT, of the exhaust gas aftertreatment component 35, 36. In one example implementation of the multiplier model block 136, information relating to soot loading of a particulate filter included in the exhaust gas aftertreatment component 35, 36 may be used to define at least one multiplier. In one specific example, one of the NOXCE multiplier blocks, e.g., the NOXCE multiplier block $138_1$, may include a model that determines or estimates soot or particulate loading of the particulate filter based on the pressure differential, $\Delta P$, across the exhaust gas aftertreatment component 35, 36 or across only the particulate filter portion of the exhaust gas aftertreatment component 35, 36. In this example, the model includes one or more tables, equations, plots and/or graphs that produces the multiplier value, M1, corresponding to an estimated percentage of remaining soot or particulate filtering capability, as a function of $\Delta P$. Generally, the multiplier value, M1, is unity for a soot-free or particulate-free filter, and M1 decreases as $\Delta P$ increases. As a specific example, if the soot or particulate loading model of the NOXCE multiplier model block $138_1$, determines, based on $\Delta P$, that the particulate filter has lost 25% particulate filtering capability as a result of soot or particulate loading, the multiplier value, M1, will be 75%. Any of the number of NOXCE multiplier model blocks $138_1$-$138_M$ may similarly be configured to compute multipliers that take into account the impact of other exhaust gas aftertreatment system operating conditions including, but not limited to, hydrocarbon poisoning, ash loading, phosphorus poisoning, sulfur poisoning, or the like. The NOXCE value produced by the logic block 102' will, in such cases, be the product of $NOXCE_T$ and each such multiplier.

Figure 7:
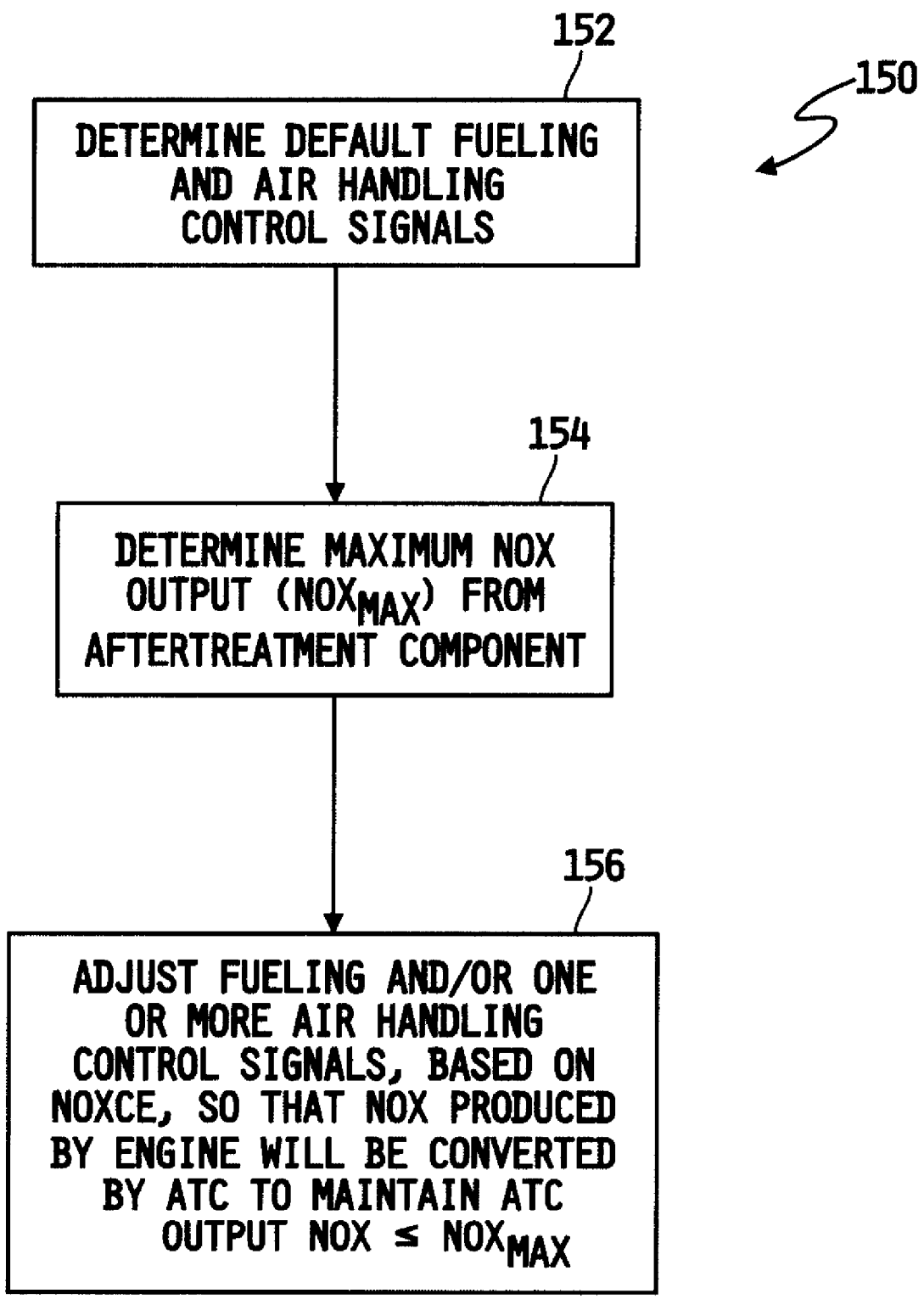
FIG. 7 is a flowchart of one illustrative process for using the NOx conversion efficiency value to control the NOx output of the engine.

Some engine calibration practices require engine fueling and/or air handling strategies to be developed that meet NOx output goals based on end-of-useful-life or near-end-of-useful-life performance of the exhaust gas aftertreatment component 35, 36. Such strategies are thus typically based on NOx conversion efficiency values that are at least for some initial period of engine operation lower than the actual NOx conversion efficiency values of the aftertreatment component 35, 36. It is therefore desirable to adjust engine fueling and/or air handling as a function of the NOx conversion efficiency value, NOXCE, produced by the logic block 102 to take into account current or near-current NOx conversion efficiency information while controlling NOx output. Such adjustment of engine fueling and/or air handling will allow NOx output to be effectively controlled with potentially improved fuel economy over at least a portion of the useful life of the exhaust gas aftertreatment component 35, 36. Referring now to FIG. 7, a flowchart of one illustrative process 150 for using the NOx conversion efficiency value, NOXCE, to control the NOx output of the engine 12 is shown. The process 150 will generally be imbedded in the fuel control logic block 104 and/or air handling control logic block 106, as illustrated in FIG. 3.

The process 150 begins at step 152 where the fuel control logic block 104 and the air handling control logic block 106 operate in a conventional manner to determine default fueling and air handing control signals, i.e., fueling and air handling control signals that the logic blocks 104 and 106 conventionally determine in the absence of the NOx conversion efficiency value, NOXCE. The air handling control signals may be or include any one or combination of EGRC, IATC and VGTC as described hereinabove. Thereafter at step 154, the control circuit 40 is operable to determine a maximum NOx output value, NOXmax, corresponding to the maximum allowable NOx amount produced by the exhaust gas aftertreatment component 35, 36. The control circuit 40 may execute step 154 in a conventional manner, such as by accessing one or more memory locations where such information may be stored. Thereafter at step 156, the fuel control logic block 104 and/or air handling control logic block 106 is/are operable to adjust the default fueling signal(s) and/or default air handling control signal(s), based on NOXCE, such that NOx produced by the engine 12 will be converted by the exhaust gas aftertreatment component 35, 36 to maintain the NOx exiting the exhaust gas aftertreatment component 35, 36 less than or equal to NOXmax. Such adjustment of the default fueling signal(s) and/or air handling control signal(s) may be accomplished in a conventional manner, such as by determining fueling signal and/or air handling control signal multiplier(s) or offset value(s) based on the default fueling and/or air handling control signal(s) and NOXCE, and adjusting the default fueling and/or air handling control signal(s) by the multiplier(s) or offset value(s). Programming of the fuel control logic block 104 and/or air handling control logic block 106 for such a fuel and/or air handling control adjustment strategy would be a mechanical step for a skilled programmer.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for determining a NOx conversion efficiency of an exhaust gas aftertreatment component coupled to an internal combustion engine, comprising:
   means for determining an operating temperature of the exhaust gas aftertreatment component, and
   a control circuit including a memory having instructions stored therein that are executable by the control circuit to determine a time duration that the operating temperature of the exhaust gas aftertreatment component is above a predefined temperature, and to determine the NOx conversion efficiency of the exhaust gas aftertreatment component as a function of the time duration, the memory further having stored therein a conversion model of the NOx conversion efficiency of the exhaust gas aftertreatment component as a function of the time duration and a multiplier model producing a multiplier as a function of at least one operating parameter that is different from the operating temperature of the exhaust gas aftertreatment component, and wherein the instructions executable by the control circuit include instructions to determine an initial value of the NOx conversion efficiency of the exhaust gas aftertreatment component, as a function of the time duration, according to the conversion model and to multiply the initial value of the NOx conversion efficiency by the multiplier to determine the NOx conversion efficiency of the exhaust gas aftertreatment component.

2. The system of claim 1 wherein the conversion model is stored in the memory as a table having a table axis defining discrete time duration values and being populated with corresponding discrete NOx conversion efficiency values.

3. The system of claim 1 further comprising means for determining a pressure differential across the exhaust gas aftertreatment component, and wherein the at least one operating parameter includes the pressure differential across the exhaust gas aftertreatment component.

4. The system of claim 3 wherein the multiplier model is configured to determine a particulate loading value as a function of the pressure differential across the exhaust gas aftertreatment component, and to determine the multiplier as a function of the particulate loading value, the particulate loading value corresponding to a reduction in particulate filtering capability resulting from particulate loading of the exhaust gas aftertreatment component.

5. The system of claim 1 wherein the memory further includes a number of multiplier models each producing a different multiplier as a function one or more operating parameters that are different from the operating temperature of the exhaust gas aftertreatment component, and wherein the instructions executable by the control circuit includes instructions to multiply the initial value of the NOx conversion efficiency by each of the different multipliers to determine the NOx conversion efficiency of the exhaust gas aftertreatment component.

6. The system of claim 1 wherein the aftertreatment component is a NOx adsorber.

7. The system of claim 1 wherein the aftertreatment component is a selective catalytic reduction (SOR) catalyst, and wherein the SOR catalyst is configured to react with engine exhaust gas and a reagent solution to reduce NOx content of the engine exhaust gas.

* * * * *